United States Patent [19]

Shealy

[11] 3,929,036

[45] Dec. 30, 1975

[54] LIMITED SLIP DIFFERENTIAL WITH NEGLIGIBLE BIAS UNDER LIGHT LOAD CONDITIONS

[75] Inventor: Noah A. Shealy, Niles, Mich.

[73] Assignee: Clark Equipment Company, Buchanan, Mich.

[22] Filed: Dec. 26, 1973

[21] Appl. No.: 428,265

[52] U.S. Cl. .................. 74/711; 74/710.5; 192/35; 192/20
[51] Int. Cl. .......................... F16h 1/44; F16d 13/04
[58] Field of Search .......... 74/710, 710.5, 711, 713; 180/44 R, 24.08, 24.09; 192/35, 20

[56] References Cited
UNITED STATES PATENTS

| | | | |
|---|---|---|---|
| 3,051,020 | 8/1962 | Hartupee | 74/710.5 |
| 3,264,901 | 8/1966 | Ferbitz et al. | 74/711 |
| 3,499,349 | 5/1968 | Hausinger | 74/710.5 |
| 3,546,968 | 12/1970 | Altmann | 74/710.5 |
| 3,657,935 | 4/1972 | O'Brien | 74/711 |
| 3,845,672 | 11/1974 | Goscenski, Jr. | 74/711 |

*Primary Examiner*—Samuel Scott
*Assistant Examiner*—P. S. Lall
*Attorney, Agent, or Firm*—Ernst H. Ruf

[57] ABSTRACT

A geared differential of the limited slip type wherein spring or bias means, exerting a predetermined force, are interposed between the outer ends of the side gears and adjacent portions of the differential carrier housing for urging each side gear in a direction opposite to the direction of the axial force applied to the side gear, via the planetary gear, thereby normally tending to urge the clutch friction discs into disengagement as long as the predetermined force is greater than the axial force, thereby permitting a high differential bias under heavy drawbar conditions and a relatively low bias under light drawbar conditions.

7 Claims, 2 Drawing Figures

LIMITED SLIP DIFFERENTIAL WITH NEGLIGIBLE BIAS UNDER LIGHT LOAD CONDITIONS

BACKGROUND OF THE INVENTION

1. Field of the Invention

The field of art to which this invention pertains includes that of machine elements and mechanisms; more specifically, limited slip differential gearing having a negligible bias under light load conditions.

2. Description of the Prior Art

Heavy duty automotive-type differentials generally include a differential carrier that supports a ring gear which in turn is driven by a driving pinion powered by a drive shaft. Differential side gears are located in the housing, one side gear being connected to the inner end of one axle shaft and the other side gear being connected to the inner end of the other axle shaft. Multiple differential pinions are generally rotatably journaled on a cross carried by the differential housing, with the pinions being in meshing engagement with the side gears.

During the normal operation of such a differential mechanism, the end thrust on the side gears is directly proportional to the torque on the ring gear. Such end thrust on the side gears is in an axial or longitudinally outward direction, that is, away from the differential and toward the axle ends. To provide a torque proportioning differential, i.e., to restrict the differential action so that one wheel will not spin if it loses traction, it is well known in the art to use clutches between the carrier (on which the ring gear is mounted) and the respective side gears. It will be appreciated that the meshing of the pinion gears with the side gears causes the previously-mentioned end thrust. The result of such end thrust is to apply the clutches and thus restrict the differential action of the mechanism. Thus, these clutches restrict the difference in speed between the two axle shafts that are connected to the side gears, which difference in speed occurs during turning operations.

One known limited slip differential of the type previously discussed has a constant bias of approximately 2.0, which means that the torque on one axle shaft can be 2 times the torque on the other shaft. This high bias, which is necessary to prevent tire slippage in many applications under many operating conditions, however, is not necessary in some other operating conditions. For instance, a logging truck requires a high bias while "access logging" when on a side grade with weight transferred to the inside tires. However, this same truck does not require a high bias while operating at high speeds on delivery or haul roads. This same reasoning also applies to many other types of equipment, particularly construction equipment.

The obvious advantages of such high bias limited slip differentials are also accompanied by such disadvantages as increased tire wear; adversely affected steering; and overloaded wheel planetaries as well as axle shafts.

SUMMARY OF THE INVENTION

This invention solves the previously-mentioned problems by permitting a high bias under heavy drawbar conditions and a relatively low bias under light drawbar conditions. This change of bias is accomplished by installing spring or bias means, such as Belleville springs, behind each one of the side gears. Specifically, the spring means, which are capable of exerting a predetermined force, are situated between an adjacent part of the carrier housing and an annular thrust side surface of the side gear adjacent to the spring means. The spring means urge the side gear in a direction opposite to direction of the axial forces applied to the side gear via the planetary gear. While the axial force applied to the side gear, via the planetary gear, urges the clutch friction discs into engagement and thus restricts the differential action of the mechanism, the spring means tend to urge the clutch friction discs into disengagement as long as the predetermined force is greater than the previously noted axial force. Thus, the spring means are strong enough to support the side gear thrust at light load so that the clutch packs are not loaded. The amount of force that the spring means can exert is, of course, variable depending upon the application requirements. Preferably, spacer means are also provided to prevent the side gears from moving too far inwardly and causing an undesirable too-close mesh between the side gears and the pinion gears. This spacer function is preferably provided by a pair of raised or increased diameter cross thrust areas that are located radially inwardly from the pinion gears.

It should be understood that the interposing of the spring or bias means between the outer ends of the side gears and carrier housing portions adjacent thereto provides an initial bias that is used to eliminate or at least minimize the initial thrust of the side gears so that there is essentially no clutching action and hence essentially no limiting action on the differential mechanism during light load conditions.

Further objects, features and advantages of the invention will become more readily understood by persons skilled in the art when following the detailed description in conjunction with the drawings.

DESCRIPTION OF THE PREFERRED EMBODIMENT

Figures 1, 2:
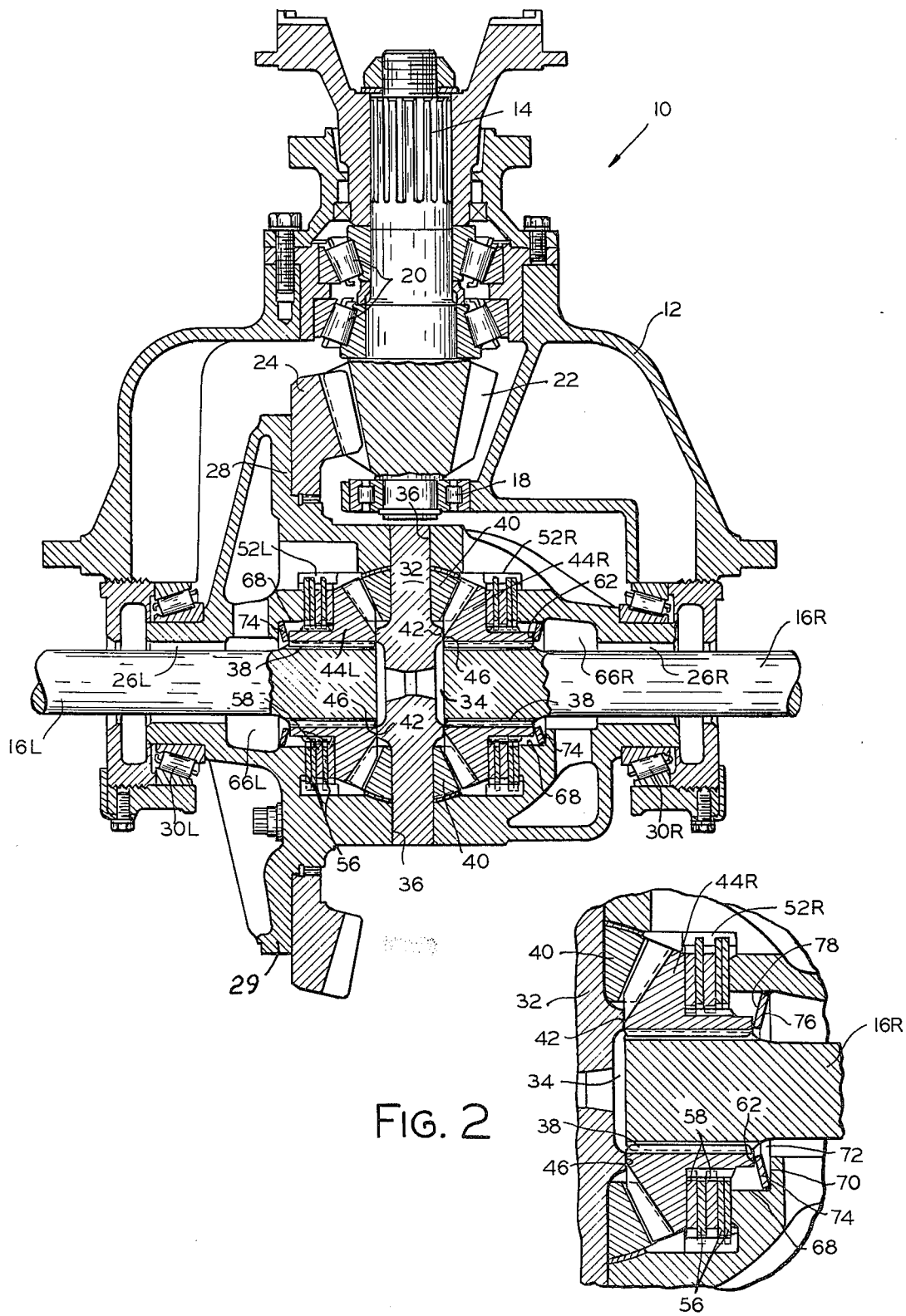
FIG. 1 illustrates a preferred embodiment of the differential mechanism of this invention.
FIG. 2 is an enlarged view of a portion of the differential shown in FIG. 1.

Referring now to the drawings, particularly FIG. 1, a differential mechanism embodying this invention is indicated generally by the numeral 10. A differential housing 12 contains the various components of the differential and provides openings for an input shaft 14 and a pair of co-axial drive axles 16L and 16R. Input shaft 14 is rotatably journaled within housing 12 upon a bearing 18 and a pair of thrust bearings 20. A driving pinion gear 22 is splined for conjoint rotation with input shaft 14, and a ring gear 24, driven by drive pinion 22, is connected to rotate a differential carrier 28 about its axis of rotation defined by tapered thrust bearings 30L and 30R.

Differential carrier 28, which includes carrier housing 29, is hollow, generally closed, and carries a "spider" or "cross" 32 having multiple shafts, each of which is diametrically disposed across the carrier cavity 34, with the ends of the cross shafts being received within diametrically opposed bores 36 formed in carrier 28 to fix the cross for rotation with the carrier.

Each shaft of cross 32, in addition to carrying a pair of planetary pinion gears 40 that are journaled radially outward near the opposite ends of the shafts, is also provided with an opposed pair of raised or increased diameter annular thrust areas or surfaces 42 that are located radially inwardly from pinion gears 40. Each of planetary pinion gears 40 engages both a side gear 44L and a side gear 44R, with cross thrust areas 42 abutting annular thrust surfaces 46 on the inner ends of side gears 44. It will be appreciated that thrust areas or thrust side surfaces 42 serve to prevent side gears 44 from moving too far inwardly and causing an undersirable too-close mesh between side gears 44 and pinion gears 40. Drive axles 16 extend into differential carrier 28 through axleways 26L and 26R formed in the carrier co-axial with its axis of rotation, with axles 16 being splined, as at 38, for conjoint rotation with their respective side gears.

Differential carrier 28 includes means for resisting the free differential action of the differential mechanism to a limited extent so that some torque may be exerted by one drive axle even if the other axle is permitted to turn free, thereby providing what has come to be known as a "limited-slip" differential. This resisting means is provided by a clutch pack 52L associated with axle 16L and a similar clutch pack 52R associated with axle 15R, each clutch pack including a plurality of annular friction discs 56 splined to carrier 28 for rotation therewith, with friction discs 56 being interleaved with a plurality of annular friction discs 58 splined for rotation with their respective side gear 44. When axles 16L and 16R are operating at the same rotative speed, there is no relative rotation between differential carrier 28 and either side gear 44L or 44R, and, therefore, no relative rotation between the interleaved friction discs in either clutch pack. However, if one axle 16L or 16R is permitted to turn more freely than the other, relative motion between its respective side gear 44 and carrier 28 must occur and this relative motion will be resisted by the friction discs of both clutch packs 52. The torque of this clutch pack resistance, in its equal but opposite reactive form, will be available to the axle 16R or 16L which is still capable of utilizing such torque.

Referring now to FIG. 2, clutch pack 52R is shown in more detail and it will be understood that this clutch pack and its associated components are allochiral duplicates of those associated with clutch pack 52L shown on FIG. 1. FIG. 2 also shows that side gear 44R, in addition to inner annular thrust surface 46, is also provided with an annular thrust area or thrust side surface 62 on the outer end thereof.

FIG. 1 also shows that as axleways 26L and 26R proceed inwardly toward differential carrier cavity 34 they expand into irregular-shaped chambers 66L and 66R that include a generally cylindrical pilot surface or shoulder 68 disposed co-axially of the longitudinal axis of drive axles 16. As best seen in FIG. 2, an annular wall surface 70 of differential carrier 28 extends radially inwardly from pilot surface 68 to form an annular pocket 72. Pilot surface 68 and annular wall surface 70 act to position a spring or bias means preferably in the form of an annular spring-type washer such as a Belleville spring 74. Each one of allochiral springs 74 includes a radial surface or margin 76 in contact with annular wall surface 70 and a radial surface or margin 78 in contact with the annular outer thrust surface 62 of side gear 44. Compression of spring washers 74 causes them to exert an axial force upon side gear annular outer thrust surface 62, thus tending to move side gears 44 longitudinally or axially inwardly until there is abutment between each side gear annular inner thrust surface 44 and cross raised thrust areas 42. Thus, areas 42 serve as spacer means for maintaining precise, conjugate registry between side gears 44 and pinion gears 40.

The differential assembly of this invention makes it possible to obtain a high bias under heavy drawbar conditions and a relatively low bias under light drawbar conditions. For example, the bias under heavy drawbar conditions will be approximately 2.0, while under light drawbar conditions, the bias will be approximately 1.25. This is accomplished by installing previously-discussed spring-type washer or Belleville spring 74, behind each one of side gears 44. These washers or springs are strong enough to support the side gear thrust at light loads so that clutch packs 52 are not loaded. The amount of force that the springs or washers exert can, of course, vary with the application requirements. Preferably, spacer means are also provided to prevent side gears 44 from moving too far inwardly and causing an undersirable too-close mesh between side gears 44 and pinion gears 40. This function is provided, for example, by the pair of raised or increased diameter cross thrust areas or surfaces 42 located radially inwardly from pinion gears 40.

In one operative example, it may be assumed that the thrust on each of side gears 44 is about 30,000 lbs. under maximum load. However, under minimum load, it is desired to neutralize the clutching effect of clutch packs 52, which is accomplished by adding Belleville washers 74 which will tend to push side gears 44 axially inwardly, or toward each other, at a force of about 3,000 lbs., for example, thus approximately neutralizing clutch pack 52 at minimum load and allowing differential 10 to act as though it had no clutches in it.

It should be appreciated that during normal, straight-ahead operation, thrust is transmitted from pinion gears 40 to side gears 44 through the intermeshing of their respective gear teeth. If, as a result of a turning operation, drive axle 16R were to turn more slowly than drive axle 16L (so that there is a differential action), then there is an augmenting force on drive axle 16R which adds to the previously noted thrust force, while on drive axle 16L there is a subtractive force which reduces the endwise thrust on the left drive axle. It should be understood that the addition of spring or biasing means 74 provides an initial bias that is used to eliminate or at least minimize the initial thrust on the side gears so that there is essentially no clutching action and hence no limiting action on the differential during light load conditions.

It will be appreciated that numerous modifications may be made in the mechanism of this invention. For example, the biasing means of this invention is not at all restricted to springs or washers but could readily take the form of a hydraulic preload, preferably on the annular outer thrust surfaces of the side gears. Another modification would be the elimination of the spacer means between the cross and the side gear in some applications. Furthermore, the spacer means, if used, are not restricted to raised cross thrust areas, but could readily be side gear extensions or of separate construction, such as interposed thrust blocks or sleeves.

From the foregoing, it is believed that those familiar with the art will readily recognize and appreciate the novel concepts and features of the present invention. Obviously, while the invention has been described in relation to only one preferred embodiment, numerous variations, changes and substitutions of equivalents will present themselves to persons skilled in the art and may be made without necessarily departing from the scope and principles of this invention. As a result, the embodiment described herein is subject to various modifications, changes and the like, with the scope of this invention being determined solely by reference to the claims appended thereto.

What is claimed is:

1. A limited slip differential mechanism comprising:
   a. a differential carrier housing;
   b. a cross disposed within said carrier housing and connected for rotation with the carrier housing;
   c. an axle shaft rotatably carried by said carrier housing;
   d. a planetary gear carried by said cross;
   e. a side gear disposed within said carrier housing, and rotatable about the carrier housing axis of rotation, said side gear being disposed adjacent to said cross, with the teeth of said side gear engaging with the teeth of said planetary gear, with the inner end of said axle shaft being drivingly connected with said side gear;
   f. friction clutch means for transmitting torque between the carrier housing and said side gear, said clutch means being disposed between an adjacent part of said carrier housing and an inner annular side surface of said side gear and including first friction means connected to the carrier housing and second friction means connected to said side gear whereby an axial force applied to said side gear, via said planetary gear, urges said clutch means first and second friction means into engagement and thus restrict the differential action of said mechanism; and
   g. spring means capable of exerting a predetermined force, situated between a further adjacent part of said carrier housing and a first annular thrust side surface of said side gear adjacent to said spring means and axially spaced from said side gear inner annular end surface whereby said side gear is urged in a direction opposite to the direction of said axial force applied to said side gear via said planetary gear, thereby normally tending to urge said clutch means first and second friction means into disengagement as long as said predetermined force is greater than said axial force, thereby providing negligible bias to said axle shaft under light load conditions.

2. The limited slip differential mechanism of claim 1 wherein said spring means comprises a Belleville spring, with one radial surface thereof engaging said further adjacent part of said carrier housing and the other radial surface thereof engaging said side gear first annular thrust side surface, thereby normally tending to urge said clutch means first and second friction means into disengagement as long as said axial force is less than said predetermined force.

3. A limited slip differential mechanism comprising:
   a. a differential carrier housing rotatable about an axis of rotation;
   b. a cross disposed within the carrier housing and connected for rotation with the carrier housing, said cross having first and second opposite sides facing along the carrier housing axis;
   c. first and second aligned axle shaft rotatably carried by said carrier housing;
   d. a planetary gear carried by said cross;
   e. a first side gear disposed within the carrier housing on said first side of said cross and rotatable about the carrier housing axis of rotation, the gear teeth of said first side gear engaging in the teeth of said planetary gear, with the inner end of said first axle shaft being drivingly connected with said first side gear;
   f. a second side gear disposed within the carrier housing on said second side of said cross and rotatable about the carrier housing axis of rotation, the gear teeth of said second gear engaging in the teeth of said planetary gear, with the inner end of said second axle shaft being drivingly connected with said second side gear;
   g. a first clutch for transmitting torque between the carrier housing and said first side gear, said first clutch being disposed between said carrier housing and an inner annular end surface of said first side gear and including a driving friction disc connected to the carrier housing and a driven friction disc connected to said first side gear;
   h. a second clutch for transmitting torque between the carrier housing and said second side gear, said second clutch being disposed between said carrier housing and an inner annular end surface of said second side gear and including a driving friction disc connected to the carrier housing and a driven friction disc connected to said second side gear, whereby an axial force applied to one of said side gears urges its respective clutch friction discs into engagement to restrict the differential action of said mechanism; and
   i. first spring means, exerting a first predetermined force, situated between said carrier housing and an adjacent thrust side surface of said first side gear axially spaced from said first side gear inner annular end surface, whereby said first side gear is urged in a direction opposite to the direction of said axial force applied to said first side gear, thereby urging said first clutch friction discs into disengagement when said predetermined force is greater than said axial force, thereby providing a negligible differential bias under light load conditions, said first clutch discs being urged into engagement when said axial force is greater than said predetermined force, thereby providing a high differential bias under heavy load conditions.

4. The limited slip differential mechanism of claim 3 further including second spring means, exerting a second predetermined force, situated between said carrier housing and an adjacent thrust side surface of said second side gear axially spaced from said second side gear inner annular end surface, whereby said second side gear is urged in a direction opposite to the direction of said axial force applied to said second side gear, thereby urging said second clutch friction discs into disengagement when said predetermined force is greater than said axial force.

5. The limited slip differential mechanism of claim 4 wherein said first and second spring means each comprise a Belleville spring, with one margin thereof being in contact with said carrier housing and the other margin thereof being in contact with said adjacent thrust side surface of said respective side gear.

6. In a limited slip differential mechanism of the type having a cross disposed within a differential carrier housing and connected for rotation therewith about an axis of rotation, a planetary gear carried by the cross, an axle shaft rotatably carried by said carrier housing, a side gear disposed within the carrier housing and having its teeth engaged with the teeth of the planetary gear, with the inner end of said axle shaft being drivingly connected with said side gear, and friction clutch means for transmitting torque between the carrier housing and the side gear wherein the clutch means is disposed between an adjacent part of the carrier housing and an inner annular end surface of the side gear and includes a first friction means connected to the carrier housing and a second friction means connected to the side gear whereby an axial force applied to the side gear, via the planetary gear, urges the clutch means first and second friction means into engagement and thus restricts the differential action of the mechanism, wherein the improvement comprises biasing means, exerting a predetermined force, located between said carrier housing and an adjacent thrust side surface of said side gear axially spaced from said side gear inner annular side surface, whereby said side gear is urged in a direction opposite to the direction of said axial force applied to the side gear, via said planetary gear, thereby urging said clutch means first and second friction means into disengagement when said predetermined force is greater than said axial force, thereby providing a negligible differential bias under light load conditions.

7. The improved differential mechanism of claim 6 wherein said biasing means comprises a Belleville spring, with one radial surface thereof engaging said carrier housing, and the other radial surface thereof engaging said side gear thrust side surface.

* * * * *